(No Model.)
J. PECKOVER.
STONE SAW.
No. 381,811. Patented Apr. 24, 1888.
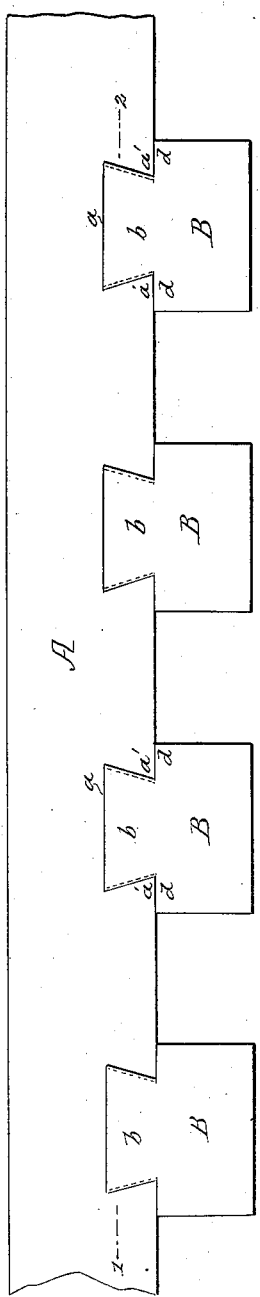
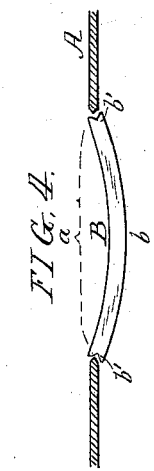
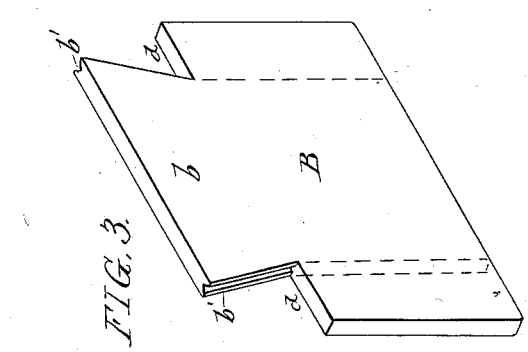
Witnesses:
John T. Lewis.
William D. Conner.
Inventor
James Peckover
by his Attorneys
Howson & Howson

UNITED STATES PATENT OFFICE.

JAMES PECKOVER, OF PHILADELPHIA, PENNSYLVANIA.

STONE-SAW.

SPECIFICATION forming part of Letters Patent No. 381,811, dated April 24, 1888.

Application filed December 7, 1887. Serial No. 257,201. (No model.)

*To all whom it may concern:*

Be it known that I, JAMES PECKOVER, a subject of the Queen of Great Britain and Ireland, and a resident of Philadelphia, Pennsylvania, have invented certain Improvements in Stone-Saws, of which the following is a specification.

The object of my invention is to provide stone-saws with teeth which can be readily inserted and removed and locked without the use of keys, and this object I attain in the manner fully described hereinafter.

In the accompanying drawings, Figure 1 is a side view of sufficient of a stone-saw to illustrate my invention. Fig. 2 is a section on the line 1 2, Fig. 1. Fig. 3 is a perspective view of one of the teeth. Figs. 4 and 5 are diagrams illustrating the manner of applying the teeth to the saw-blade. Figs. 6 and 7 are views of modifications, and Figs. 8, 9, and 10 are diagrams showing one manner of removing worn out teeth.

Stone-saws are usually made of soft iron, so that when cutting the stone the sand used will embed itself in the iron and form a series of projecting cutters, which serve to sever the stone.

Referring to Figs. 1, 2, and 3, A is the body of the saw, having a series of dovetailed or equivalent undercut recesses, $a$.

B is the tooth of the saw, preferably thicker than the blade in cross-section, as shown in Fig. 2. The tooth has a tapered shank, $b$, corresponding in shape to the dovetailed recess $a$ in the blade, and said shank has grooved edges $b'$, adapted to embrace the blade at the sides of the recess. The shank $b$ is somewhat narrower than the tooth, thus forming shoulders $d$, which bear against the lower edge, $a'$, of the saw-blade, as shown in Fig. 1, the top of the shank $b$ resting against the blade at the top of the recess $a$. In some cases, however, the shoulders on the saw-tooth may be dispensed with, as shown by dotted lines in Fig. 3.

To insert the tooth into the blade of the saw, the tooth is bent or sprung until the edges of the shank $b$ of the tooth can pass into the recess $a$ from the side, as shown in Fig. 4, and when inserted the tooth is flattened out, as shown in Fig. 5, so that the grooved edges of the shank embrace the blade at the opposite sides of the recess $a$, and as the tooth is expanded into the recess the shoulders of the tooth are jammed against the under side of the blade and the top of the shank against the blade at the top of the recess, thus insuring a firm and secure fastening of the tooth to the blade without the use of separate keys or like fastenings.

When the tooth is worn out, it can be removed by a reversal of the above-described operations. In Figs. 8 and 9, however, I have shown a recess, $a$, deeper than the shank of the tooth, in order that the tooth, when worn, can be removed without bending.

When the tooth is worn out, there still remain small pieces $c\ c$ of the tooth; but when these pieces are bent down, as shown in Fig. 10, the shank $b$ can be forced up into the recess $a$ until its grooved edges are free from engagement with the blade, whereupon the shank can be removed laterally and a new tooth inserted in its stead.

It will be evident on reference to Figs. 6 and 7 that V-shaped grooves in the shanks of the teeth are not necessary to the proper carrying out of my invention and that grooves may be made in the blade of the saw for the reception of ribs on the shank of the tooth in place of the construction shown in Figs. 1 to 5.

It will be understood that this tooth may be used in other saws than stone-saws and on other forms of saws—such as circular saws— without departing from my invention, and teeth having such elasticity that their shanks may be sprung sufficiently to enter the recesses in the blade may be used in place of the soft-metal teeth.

I claim as my invention—

1. The combination of a saw-blade having an undercut recess with a tooth having a correspondingly-shaped shank, forming a tongue-and-groove joint at the sides of the recess, said shank being flexible, so that it can be bent for lateral insertion into the recess and afterward spread thereinto, all substantially as specified.

2. The combination of a saw-tooth having an undercut shank and side shoulders, d, beneath the same with a saw-blade having an undercut recess corresponding in shape with the shank of the tooth, the edges of which are grooved to receive the saw-blade, all substantially as set forth.

3. The combination of a saw-blade having an undercut recess and a tooth having side shoulders, d, and an undercut shank adapted to the recess, the latter being of a depth greater than the shank of the tooth, substantially as described.

In testimony whereof I have signed my name to this specification in the presence of two subscribing witnesses.

JAMES PECKOVER.

Witnesses:
WILLIAM D. CONNER,
HARRY SMITH.